United States Patent [19]

Tsubosaka

[11] Patent Number: 5,682,182
[45] Date of Patent: Oct. 28, 1997

[54] EXTERIOR STRUCTURE FOR DISPLAY DEVICE HAVING DISPLAY-COVER SERVING AS PART OF STAND AND NOT REMOVED FROM MAIN BODY

[75] Inventor: Yukihiro Tsubosaka, Yamatokooriyama, Japan

[73] Assignee: Sharp Kabushiki Kaisha, Osaka, Japan

[21] Appl. No.: 313,593

[22] Filed: Sep. 29, 1994

[30] Foreign Application Priority Data

Sep. 30, 1993 [JP] Japan .................................... 5-244706

[51] Int. Cl.⁶ .................................................... G09G 5/00
[52] U.S. Cl. .......................... 345/173; 345/905; 361/680; 361/681; 361/683
[58] Field of Search .............................. 345/1, 905, 173; 361/681, 683, 696, 702, 709; 364/708.1

[56] References Cited

U.S. PATENT DOCUMENTS

| | | |
|---|---|---|
| 4,113,212 | 9/1978 | Coriden . |
| 4,259,568 | 3/1981 | Dynesen ............................ 235/1 D |
| 4,571,456 | 2/1986 | Paulsen et al. ..................... 361/386 |
| 4,918,632 | 4/1990 | York ................................ 364/708.1 |
| 5,085,394 | 2/1992 | Torii ................................ 361/681 |
| 5,100,098 | 3/1992 | Hawkins ........................... 364/708.1 |
| 5,128,829 | 7/1992 | Loew ............................... 361/380 |
| 5,166,893 | 11/1992 | Hosoi ............................... 364/708 |
| 5,193,672 | 3/1993 | Long ................................ 206/45.2 |
| 5,209,448 | 5/1993 | Hatanaka .......................... 361/681 |
| 5,229,757 | 7/1993 | Takamiya .......................... 361/681 |
| 5,247,285 | 9/1993 | Yokota .............................. 361/681 |
| 5,267,123 | 11/1993 | Boothroyd ......................... 361/681 |
| 5,375,076 | 12/1994 | Goodrich ........................... 361/681 |
| 5,483,253 | 1/1996 | Suganuma .......................... 345/905 |

FOREIGN PATENT DOCUMENTS 4315250 11/1992 Japan .

*Primary Examiner*—Richard Hjerpe
*Assistant Examiner*—Kent Chang

[57] ABSTRACT

There is provided an exterior structure which can enhance operability of display devices, reduce the number of parts, shorten time for assembly of products, and improve its productivity, and yet which allows reduction in cost, reduction in weight of products, and moreover which can prevent loss of a display-section cover and the like. A display section is present on a first surface of a main body, and a display-section cover is provided on a second surface adjacent to the first surface. The display-section cover is made up of a generally rectangular hinge plate attached in a hinge fashion with one edge of the hinge plate parallel to the first surface, and a display lid having such a shape as to be able to cover a display section of the first surface and being attached in a hinge fashion to the other edge of the hinge plate opposite to the one edge. A support plate is attached in a hinge fashion with one edge thereof parallel to the second surface to a third surface of the main body opposite to the first surface. The display lid is provided with slots capable of captively holding the support plate.

13 Claims, 13 Drawing Sheets

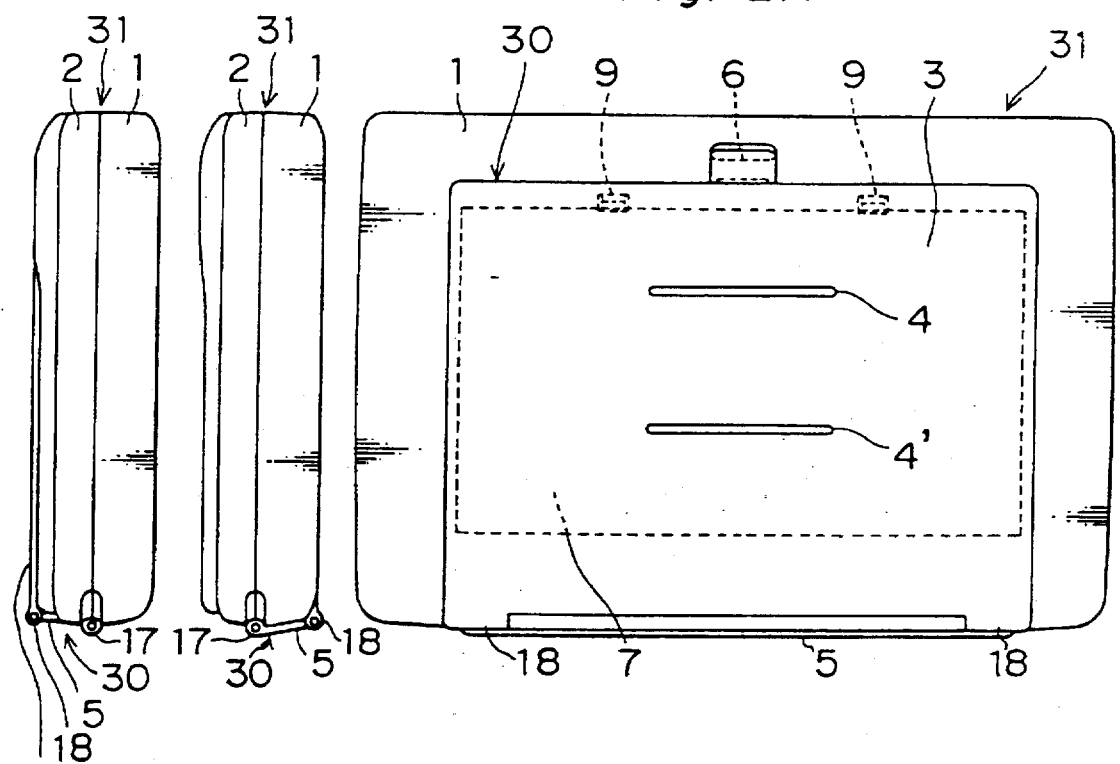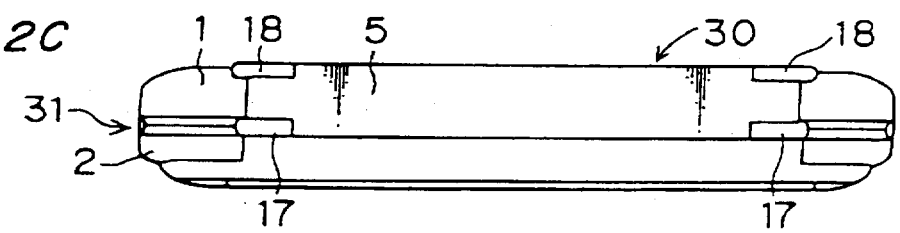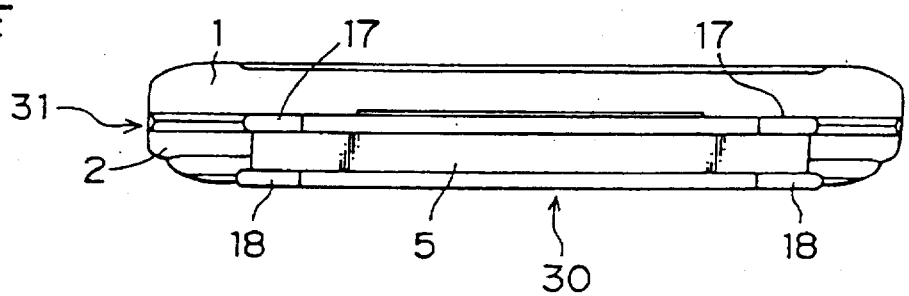

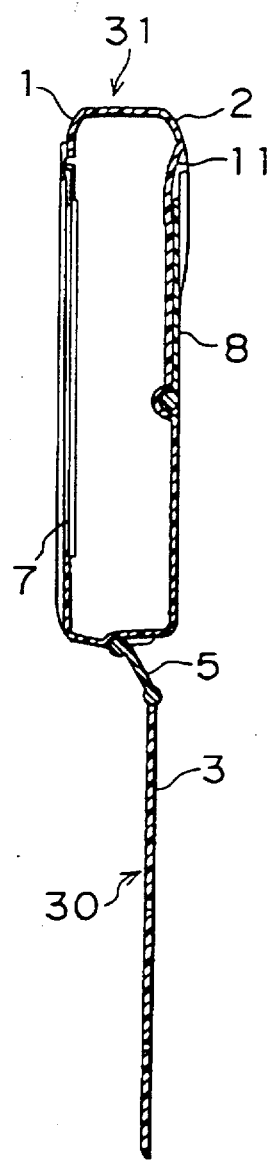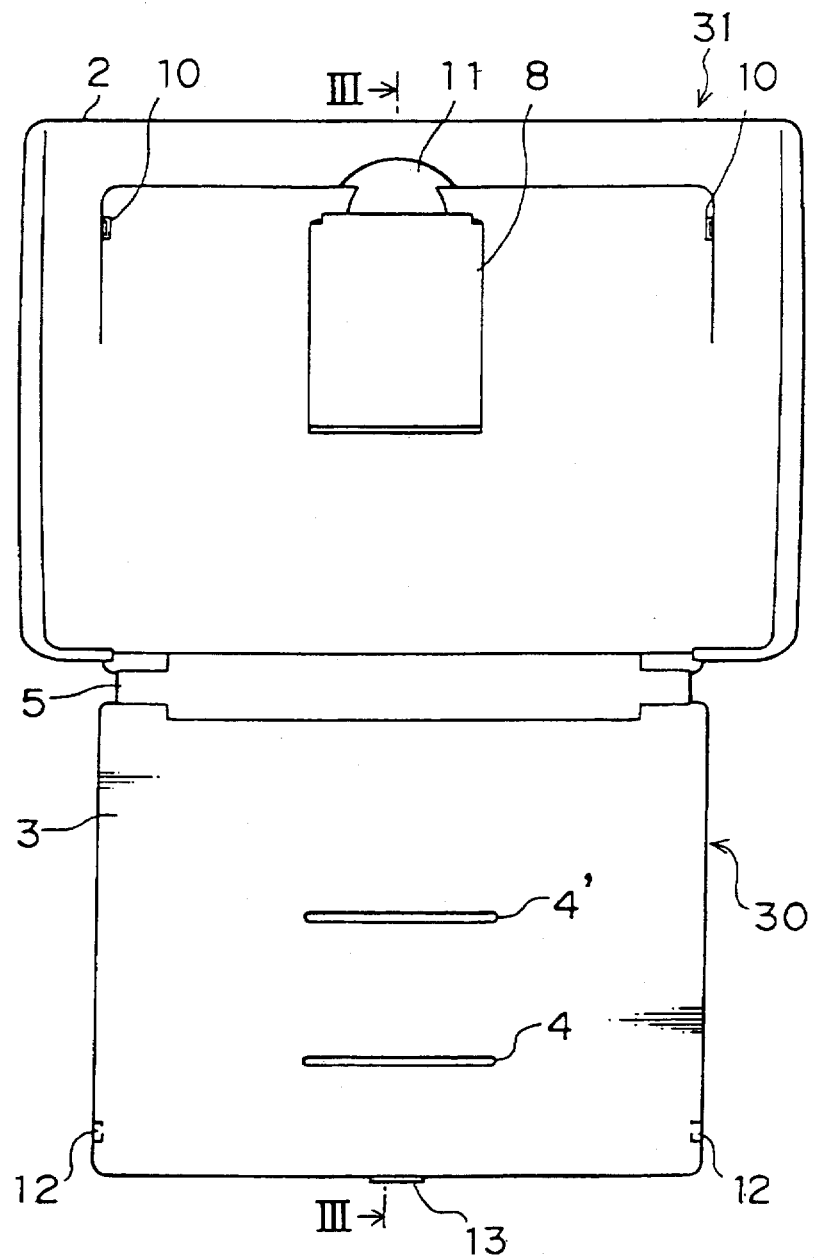

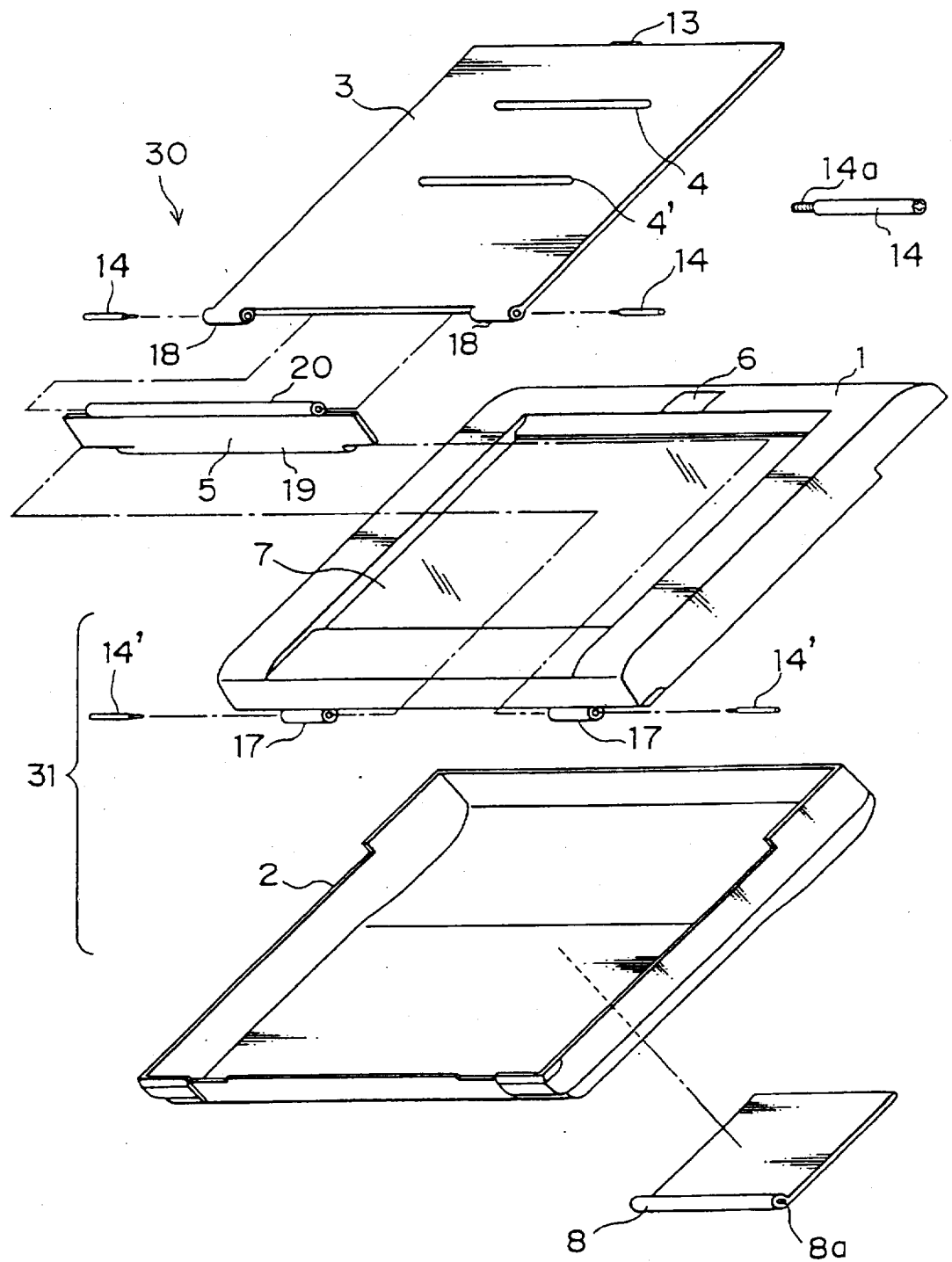

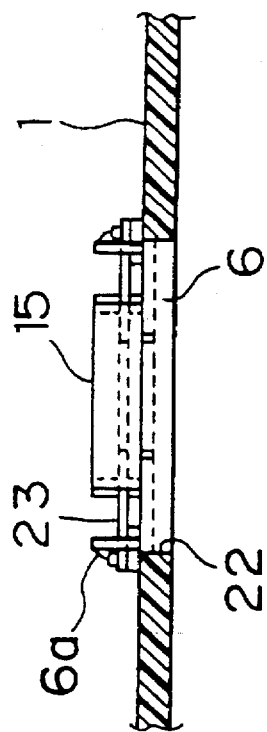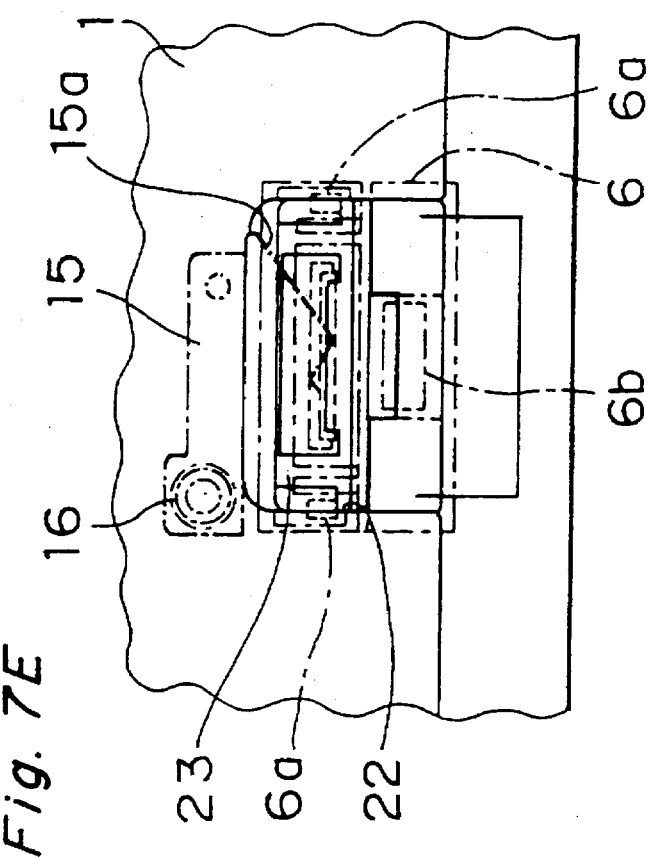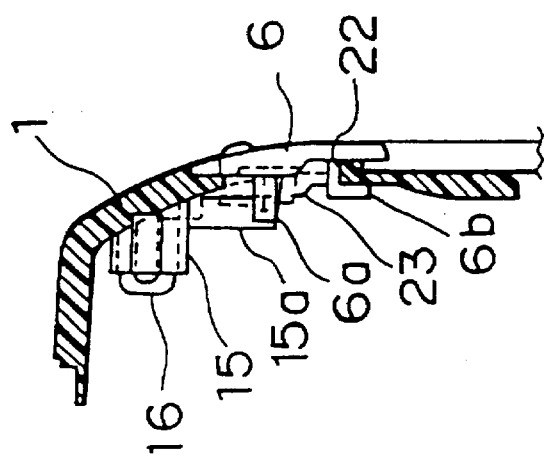

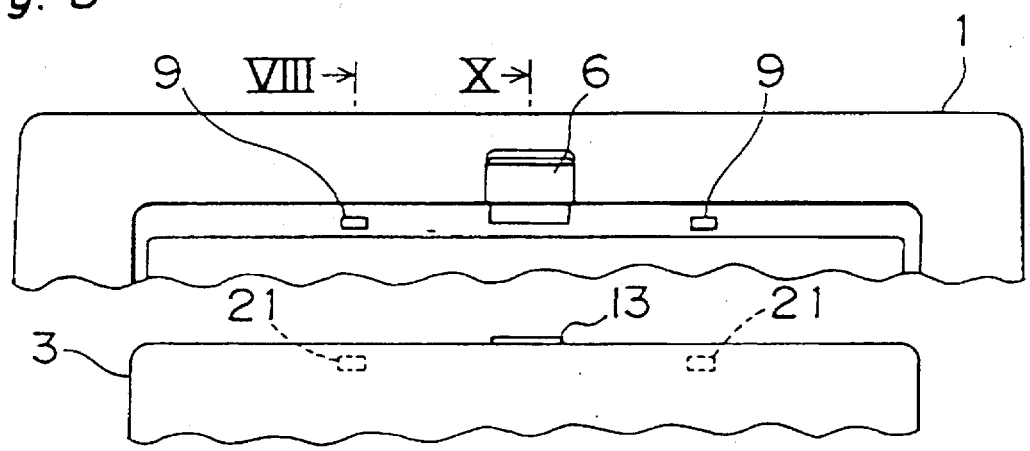
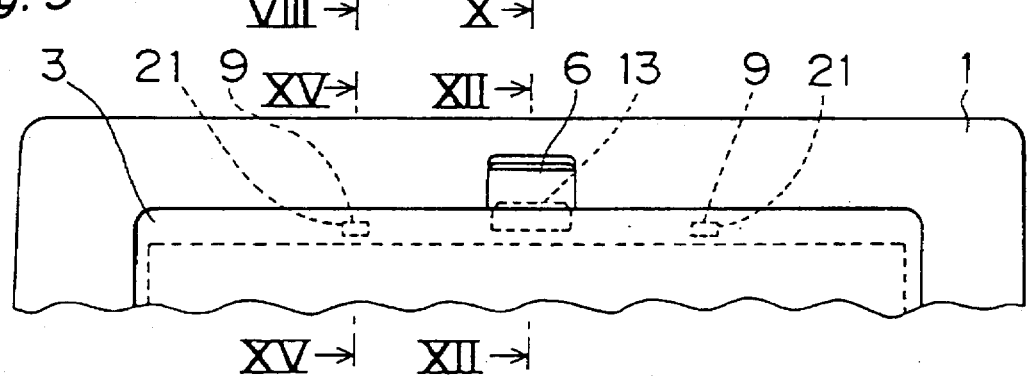

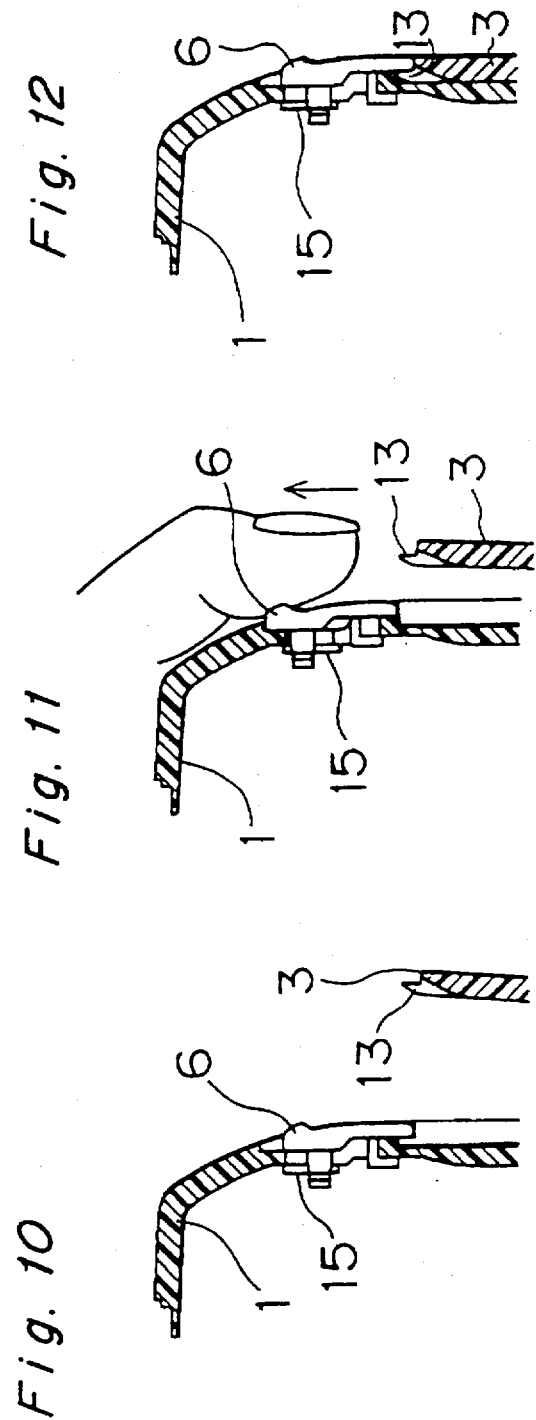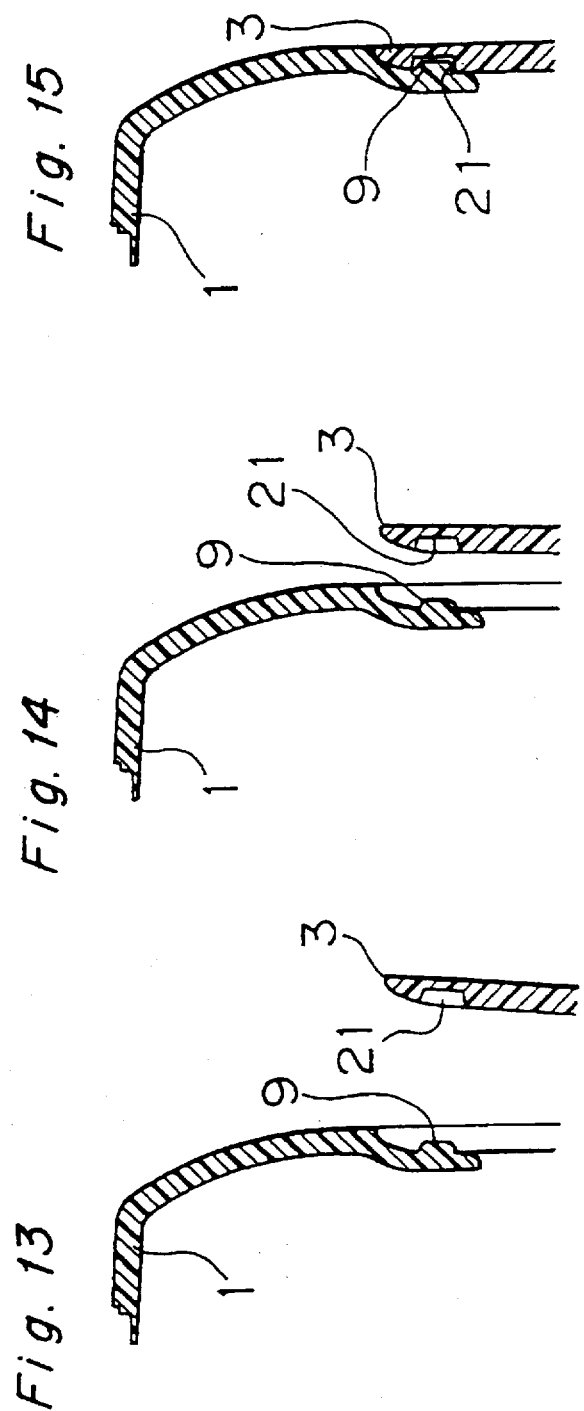

EXTERIOR STRUCTURE FOR DISPLAY DEVICE HAVING DISPLAY-COVER SERVING AS PART OF STAND AND NOT REMOVED FROM MAIN BODY

BACKGROUND OF THE INVENTION

1. Field of the Invention

The present invention relates to an exterior structure for display devices. More specifically, the invention relates to an exterior structure for a display device having a display section for displaying an image on one surface of a generally box-shaped main body of the device. The structure comprises a display-section cover that functions to cover the display section and that can also be used as part of a stand supporting the device.

2. Description of the Prior Art

In small-sized, portable display devices having a display section such as an LCD (liquid crystal display) panel on one surface of the main body (i.e., information processing apparatus and the like having a display section), if the body is laid down in use with a full keyboard connected thereto, the user must be positioned to look into the display section, resulting in poor operability and therefore less progress in working with the device. Also, such positioning may cause physical fatigue of an operator. Thus, in order that the operator can view the display section in a correct position, it is often the case that a stand is provided to support the main body obliquely to a surface, for example a desk. Further, the LCD display surface or a tablet surface is subject to flaws, dust, heat, and the like and, if the display device is dropped, shocks applied may cause surfaces to be damaged. For these reasons, a cover for protecting the display section is provided.

Conventionally, for example, portable pen-input personal computers as shown in FIGS. 18A to 18E are provided with a stand 103 and a display-section cover 104. The stand 103, as shown in FIGS. 18A and 18B, is plate-shaped attached to a rear side of a main body 101 via a hinge 105. The stand 103, which is of the so-called fold-down type, is tilted to a position along the rear side of the main body for storage and transport. Meanwhile, for use of the device, the stand 103 is rotated around the hinge 105 from the position along the rear side of the main body to a proper position, where the stand 103 is stopped in the position by engaging mechanism (not shown), thus supporting the main body 101. Further, as shown in FIGS. 18C, 18D, and 18E, the display-section cover 104 is generally U-shaped in cross section, covering a display section (LCD) 102 of the main body and its side faces. A groove 106 extending in parallel to the display surface is provided on each side face of the main body 101. A projection 107 that will be fitted in the groove 106 is provided on end inner surfaces of the U-shape of the display-section cover 104. The display-section cover 104, which is of the so-called slide-removable type, will cover the main body 101 with the projection 107 fitted to the groove 106 of the main body, for storage and transport. Meanwhile, for use of the display device, the display-section cover 104 will be moved along the groove 106 and removed from the main body 101.

However, it is conventional practice that the stand and the display-section cover are provided separately and independently of each other. Therefore, the number of parts involved increases in correspondence to the parts making up the stand and the display-section cover. This causes problems such as too much time required for assembling process, lowered productivity, and wasteful cost in the manufacture of products. Also, the increased number of parts leads directly to increased weight of products, such that light weight, which is the essential condition required for portable devices, may be lost and that the operability inherent in the devices may be impaired, as a further problem.

Further, since the display-section cover and the stand are provided separately and independently of each other, two steps of removing and placing the display-section cover on the desk and then setting up the stand are involved at the start of use of the device. Also, two steps reverse to the above are required at the end of use. Thus, there is a problem that the operation for start and end of use is troublesome.

Furthermore, since the display-section cover is a removable type, there are possibilities of loss of the cover and other problems (similar problems may occur also when the stand is removable type).

SUMMARY OF THE INVENTION

The object of the present invention is therefore to provide an exterior structure for display devices, which can solve the above problems by comprising a display-section cover that can be used without being removed from the main body and that can be used also as part of the stand.

Japanese Patent Laid-Open Publication HEI 4-315250 has disclosed an electronic apparatus having a keyboard section (serving as a display-section cover) that is used without being removed from the apparatus body. This electronic apparatus has an intermediate member provided between the apparatus body and the keyboard section and mechanically coupled with the apparatus body and the keyboard section by two hinges. In this apparatus, the apparatus body and the keyboard section are rotatable 360°, whereby the hinges are prevented from damage. Moreover, the electronic apparatus is good at operability even if operated in a hand or in close contact to the table, advantageously. However, unlike the present invention described below, the keyboard section is not designed to be used also as a stand. Also, the apparatus has no support plate and differs from the present invention in construction of the hinge plate.

In order to achieve the aforementioned object, the present invention provides an exterior structure for a display device having a display section for displaying an image on a first surface of a main body of a generally box shape, comprising:

a display-section cover which comprises a generally rectangular hinge plate attached in a hinge fashion to a second surface of the main body adjacent to the first surface, with one edge of the hinge plate parallel to the first surface, and a display lid attached in a hinge fashion to the other edge of the hinge plate opposite to the one edge of the hinge plate.

With the above-described exterior structure for a display device, when the device is stored or carried, the hinge plate of the display-section cover is tilted to a first surface side of the main body, and the display lid is put into contact with the first surface. Therefore, the display section is covered with the display lid, whereby the display section is protected from flaws, dusts, heat, and the like. When the device is used, the hinge plate of the display-section cover is tilted down to a third surface side, so that the display lid is put into contact with the third surface. Or, in the stand mode as described later, the display-section cover is used as part of the stand. As a result, the operator is allowed to operate the device while viewing the display section.

In an embodiment of the present invention, the one edge of the hinge plate is attached substantially within the second surface of the main body at a generally center portion with respect to a direction vertical to the first surface, and a size or dimension between the one edge and the other edge of the hinge plate is set to substantially half a size of the second surface of the main body in the direction vertical to the first surface of the main body.

With the exterior structure for a display device according to the embodiment, the one edge of the hinge plate is attached substantially within a second surface of the main body generally in a center with respect to a direction vertical to the first surface. The size between the one edge and the other edge of the hinge plate is set to approximately half the size of the second surface in the vertical direction. Therefore, when the device is stored or carried, and when it is used, the display-section cover will not make an obstacle. More specifically, for storage or carrying, the hinge plate is tilted down to the first surface side of the main body, so that the other edge of the hinge plate is brought to the corner between the second and first surfaces. The display lid bently adjoins to the other edge of the hinge plate, covering the display-section cover of the main body. Accordingly, there is no clearance between the display-section cover and the main body so that the display section will not make an obstacle. Further, for use of the device, the hinge plate is tilted down to the third surface side of the main body, so that the other edge of the hinge plate is brought to the corner between the second and the third surfaces. The display lid bently adjoins to the other edge of the hinge plate, covering the display section of the main body or being used as part of the stand. Accordingly, the display section will not make an obstacle.

In an embodiment of the present invention, there is further provided a support plate having a generally rectangular shape and being attached in a hinge fashion to a third surface opposite to the first surface of the main body with one edge of the support plate parallel to the second surface;

wherein the display lid comprises an engaging portion capable of captively holding the other edge of the support plate opposite to the one edge.

With the exterior structure for a display device according to the embodiment, when the device is used, the second surface is arranged, for example, on the lower side of the first surface of the main body. The hinge plate is tilted down to the third surface side of the main body, and the display lid is placed, for example, on the desk in parallel. Then, upper part of the main body is tilted down diagonally to the third surface side, and the other edge of the support plate is edge with the engaging portion of the display lid. By this arrangement, the display-section cover and the support plate make up a stand, whereby the main body is supported diagonally to the desk (stand mode). In this way, it is arranged not that the display-section cover and the stand are provided independently of each other, but that the display-section cover forms part of the stand. Therefore, the operation required before use is only one step of turning the display-section cover to the rear of the main body so that the display-section cover serves as the stand, and also only one step will be required for restoration of the original state after use. Accordingly, the operation for start and end of use of the device can be simplified as compared with the conventional counterpart. Also, the number of parts involved is reduced as compared with the case where the display-section cover and the stand are provided independently of each other. As a result, the time required for product assembly can be shortened, productivity can be improved, and yet wasteful cost can be eliminated. Further, the reduced number of parts involved allows product weight to be reduced, so that the free operability inherent in the portable device is exploited to the most. Furthermore, since the display-section cover and the support plate are attached integrally to the main body, there is no possibility that the display-section cover or the like may be lost.

In an embodiment of the present invention, the engaging portion of the display lid is at least a slot formed in parallel to the other edge of the hinge plate.

With the exterior structure for a display device according to the embodiment, the engaging portion of the display lid is at least a slot formed in parallel to the other edge of the hinge plate. Accordingly, when the stand mode is taken at the time of start of use, the other edge of the support plate is inserted into the slot of the display lid, whereby the display lid can be easily captively held. Also after use, the display lid can be restored to the original state only by pulling off the other edge of the support plate from the slot of the display lid. Thus, the operation for start and end of use of the display device can be further simplified, so that the operability can be enhanced.

With the exterior structure for a display device according to an embodiment of the present invention, the second surface of the main body is a surface on the lower or upper side of the first surface. When the second surface is a surface on the lower side of the first surface, the hinge plate is tilted down to the third surface side of the main body, and the display lid is positioned on the desk in parallel, as described above. Then, the upper part of the main body is tilted down to the third surface side, and the other edge of the support plate is inserted into the slot of the display lid and held as such. As a result, the display-section cover and the support plate make up a stand, so that the main body is supported diagonally to the desk (stand mode). Meanwhile, when the second surface is a surface on the upper side of the first surface, the hinge plate is tilted down to the third surface side of the main body, and the end of the display lid is put into diagonal contact with the desk. Then, the upper part of the main body is tilted down to the third surface side, so that the other edge of the support plate is inserted into the slot of the display lid and held as such. The main body is be supported by a lower end corner of the third surface and an end of the display lid (stand mode).

With the exterior structure for a display device according to an embodiment of the present invention, a plurality of slots of the display lid are provided with a spacing to one another. Accordingly, the angle formed by the third surface of the main body and the display lid is variable stepwise by selecting a slot into which the support plate is inserted, whereby the angle of the first surface of the main body is controlled. As a result, the operator is allowed to view the display section at an optimum angle, which leads to further improved operability.

With the exterior structure for a display device according to an embodiment of the present invention, the slots of the display lid are running through the lid surface. Besides, an inner surface of the slot farther than the hinge plate is curved inward of the slot in a convex shape in cross section, and the end of the other edge side of the support plate is curved in a concave shape in cross section so as to fit to the inner surface of the slot. Therefore, even if the second surface is on the upper side of the first surface, the display lid is captively held by the support plate with stability.

With the exterior structure for a display device according to an embodiment of the present invention, the lock mechanism for captively holding the display lid is provided on the first or third surface or both the first and third surfaces of the main body. When the lock mechanism is provided on the first surface, the display lid is captively held to the first surface for storage or carrying, whereby the display lid will not open even if dropped and subjected to shocks. Accordingly, the display section is protected securely. Also, when the lock mechanism is provided on the third surface, the display lid is captively held to the third surface with the hinge plate tilted down to the third surface side and with the display lid in contact with the third surface during use of the device. As a result, the display lid can be prevented from swinging and making an obstacle when the main body is lifted.

With the exterior structure for a display device according to an embodiment of the present invention, the lock mechanism on the first surface of the main body is provided at a position on one side of the first surface opposite to the second surface side with respect to the display section. Further, the lock mechanism comprises a lock slidable toward the display section along the first surface, and an elastic member for biasing the lock toward the display section. To lock the display lid to the first surface, the operator first slides the lock toward one side opposite to the display section, and causes the display lid to be put into contact with the first surface. Subsequently, when the operator releases the lock, the lock is biased by the elastic member so that the lock slides toward the display section. As a result, the display lid is engaged with the lock, whereby the display lid is locked securely. The display lid can be unlocked by sliding the lock toward one side opposite to the display section and pulling up the display lid from the first surface.

With the exterior structure for a display device according to an embodiment of the present invention, the lock mechanism on the third surface of the main body is provided on the peripheral portion of the inner area of the third surface with which the display lid will make contact. The lock mechanism comprises a plate-shaped convex separated from the surface of the inner area and projecting into the inner area by a specified extent. When the display lid is locked to the third surface, the display lid is pressed against the third surface. Then the display lid, going beyond the plate-shaped projection, is engaged with the third surface and thus locked. When the display lid is removed, the display lid is pulled up while being warped. Then the display lid goes beyond the plate-shaped projection and is thus unlocked.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1A shows a state that the overall surface of a body is covered with a display-section cover, FIG. 1B shows a state that the display-section cover has been turned to the rear, and FIG. 1C shows a stand mode suited for use on a desk for example;

FIG. 2A is an elevational view showing a state that the display-section cover of the personal computer is closed on the front face;

FIG. 2B is a view of FIG. 2A viewed from above;

FIG. 2C is a view of FIG. 2B viewed from below;

FIG. 2D is a view of FIG. 2B viewed from side;

FIG. 2E is a view of a state that the display-section cover of the personal computer is closed on the rear face, as it is viewed from below;

FIG. 2F is a view of a state that the display-section cover of the personal computer is closed on the rear face, as it is viewed from side;

FIG. 3A is a view showing a state that the display-section cover of the personal computer is opened;

FIG. 3B is a sectional view taken along a line III—III of FIG. 3A;

FIG. 6 is an exploded view for showing parts configuration of the personal computer;

FIG. 7C is a sectional view of a cabinet upper part after the display-lid lock mechanism has been attached, as it is viewed from side;

FIG. 7D is a sectional view of a cabinet upper part after the display-lid lock mechanism has been attached, as it is viewed from above;

FIG. 7E is a sectional view of the cabinet upper portion before a lock and a spring member are attached, as it is viewed from front;

FIGS. 8 to 15 are views showing the operation of the display-lid lock mechanism, where FIG. 8 is a state of the cabinet front-face upper part before locking (open state), FIG. 9 is a state after the locking (closed state), FIG. 10 is a sectional view taken along the line X—X of FIG. 8 (open state), FIG. 11 is a view showing a transition from FIG. 10 to FIG. 12 state, FIG. 12 is a sectional view taken along the line XII—XII of FIG. 9 (closed state), FIG. 13 is a sectional view taken along the line XIII—XIII of FIG. 8 (open state), FIG. 14 is a view showing a transition from FIG. 13 to FIG. 15 state, and FIG. 15 is a sectional view taken along the line XV—XV of FIG. 9 (closed state);

DETAILED DESCRIPTION OF THE PREFERRED EMBODIMENTS

Now the exterior structure for display devices according to the present invention is described in detail by way of embodiments.

Figure 1A:
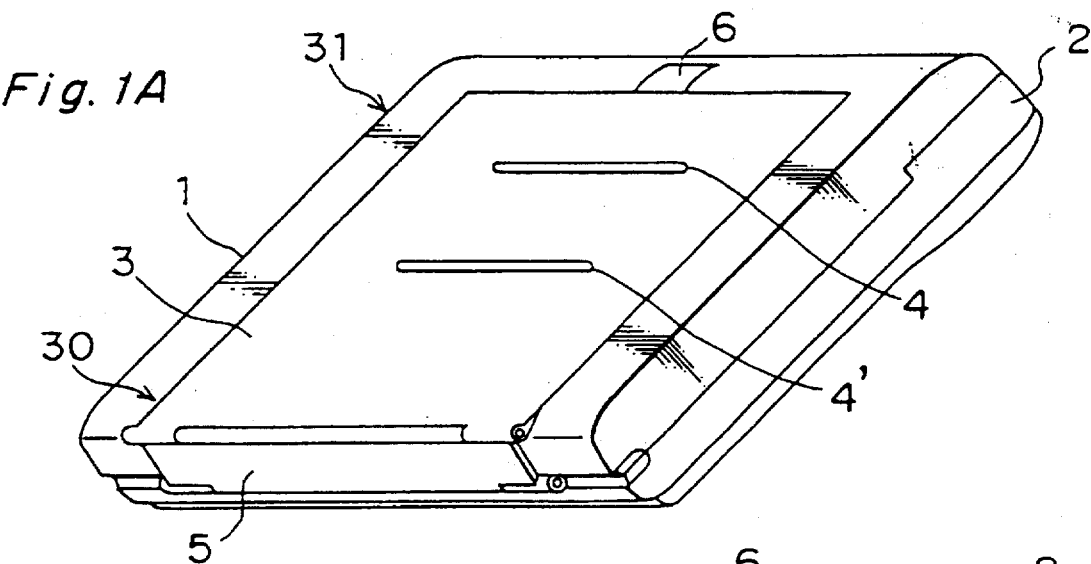
FIGS. 1A to 1C are views of a portable pen-input personal computer having an exterior structure according to an embodiment of the present invention as it is viewed overall diagonally, where
Figure 1B:
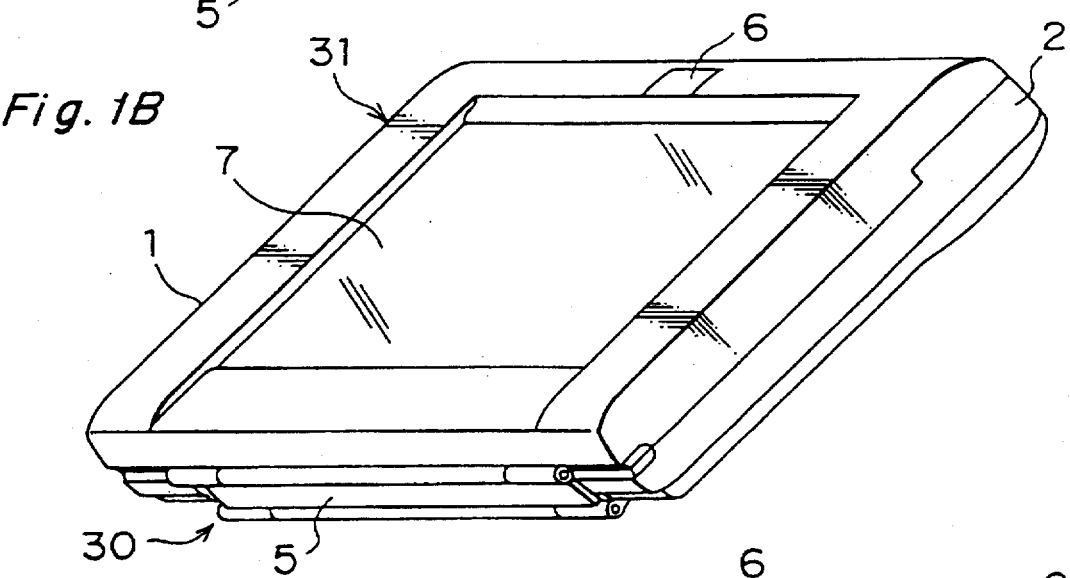
Figure 1C:
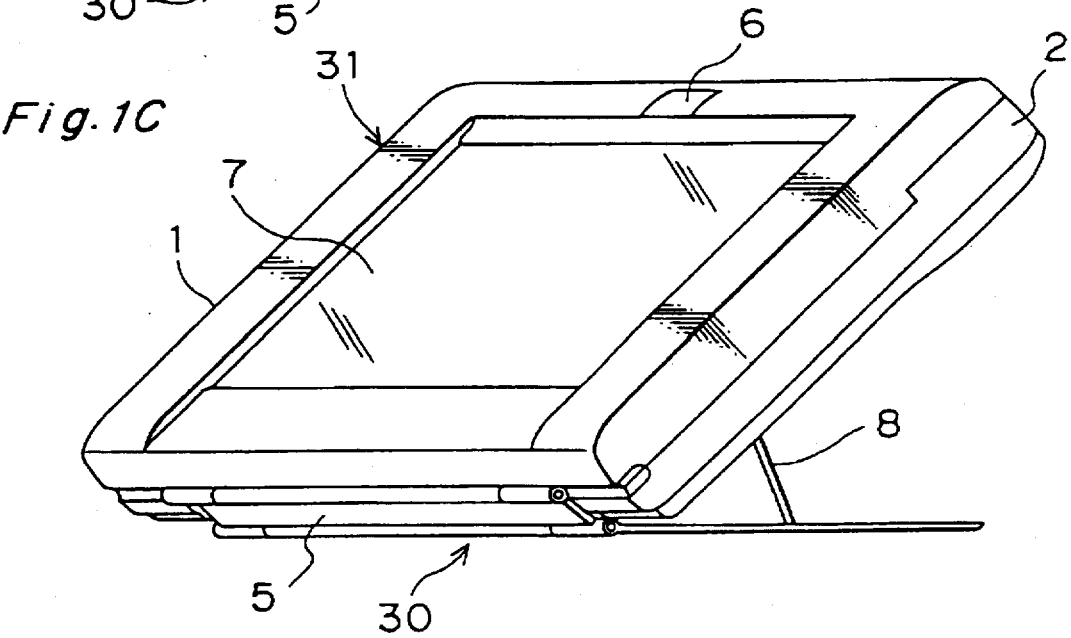

FIGS. 1A to 1C illustrate a portable pen-input personal computer having an exterior structure according to an embodiment of the present invention, as it is viewed overall diagonally. FIG. 1A is a state that the front face of a main body 31 is covered with a display-section cover 30, FIG. 1B is a state that the display-section cover 30 has been turned to the rear, and FIG. 1C is a stand mode suited for use on the desk. It is noted that the terms, upper and lower or right and left or front and rear are used hereinbelow by referencing the eye of the operator with which the operator performs operation in the stand mode, unless otherwise specified.

As shown in FIG. 6, the main body 31 of this personal computer comprises an upper cabinet 1 and a lower cabinet 2. The upper cabinet 1 and the lower cabinet 2 are combined front and rear so as to form the main body 31 of a box shape. A display section 7 is provided over the generally entire area of the front face of the upper cabinet 1 except its framing peripheral portion. A lock 6 is provided at an upper side of the display section 7. Cylindrical pin holders 17, 17 are provided at a lower portion of the upper cabinet 1 on both right and left sides of an edge at which the upper cabinet 1 is in contact with the lower cabinet 2. Meanwhile, a rectangular support plate 8 is attached on the rear face of the lower cabinet 2 at its generally center portion by a pin 8a in a hinge fashion (rotatable around the horizontal pin 8a).

As shown in FIG. 6, the display-section cover 30 comprises a rectangular display lid 3 having a size slightly larger than that of the display section 7, and a rectangular hinge plate 5. The display lid 3 has slots 4, 4' provided at upper and lower specified portions for insertion of the support plate (angular control), the slots 4, 4' serving as engaging portions and extending linearly in the lateral direction through the display lid 3. Also, a projection 13 for locking the display lid 3 is provided on the upper edge of the display lid 3. Cylindrical pin holders 18, 18 are provided on both sides of the lower edge of the display lid 3. The lateral size of the hinge plate 5 is set equal to the lateral size of the display lid 3, and the size of the remaining edges of the hinge plate 5 is set to half the thickness of the main body 31 (length between the front face of the upper cabinet 1 and the rear face of the lower cabinet 2). Pin receivers 20, 19 having a threaded hole cut on both end faces of a cylindrical column are provided on upper and lower edges of the hinge plate 5. The lateral size of the pin receivers 20, 19 is set approximately equal to the length between the pin holders 18 and 18 and the pin holders 17 and 17, respectively. The display lid 3 and the hinge plate 5 are installed in a hinge fashion by arranging the pin holders 18, 18 and the pin receiver 20 coaxially, and then penetrating a pin 14 (having a screw portion 14a as shown in FIG. 6) through the pin holder 18 and further screwing the screw portion 14a to the pin receiver 20. Also, the hinge plate 5 and the upper cabinet 1 are installed in a hinge fashion by arranging the pin receiver 19 and the pin holders 17, 17 coaxially, and then penetrating a pin 14' (similar to the pin 14) through the pin holder 17 and further screwing the screw portion 14a to the pin receiver 19. Thus, the display-section cover 30 is attached integrally to the main body 31.

FIG. 2A illustrates the front face of the main body 31 as it is viewed-straightly in a state that the display-section cover has been attached and the display lid 3 is closed. FIGS. 2B, 2C, and 2D are views of FIG. 2A as it is viewed from above, below, and side, respectively. The display-section cover 30 is in contact with the main body 31 without clearances, by the setting of the size of the hinge plate 5. As shown in FIG. 2A, projections 9 for anti-slide use, which form part of a display-lid lock mechanism, are provided above the display section 7 of the upper cabinet 1. As will be described later, with the display lid 3 closed, the projections 9 of the upper cabinet 1 are fitted in recesses on the display lid 3 side. It is noted that FIGS. 2E and 2F show a state in which the display lid 3 is opened in FIGS. 2C and 2D, respectively, and turned to the rear and locked as such. In this state, the display-section cover 30 is also in contact with the main body 31 without clearances.

Figure 7A:
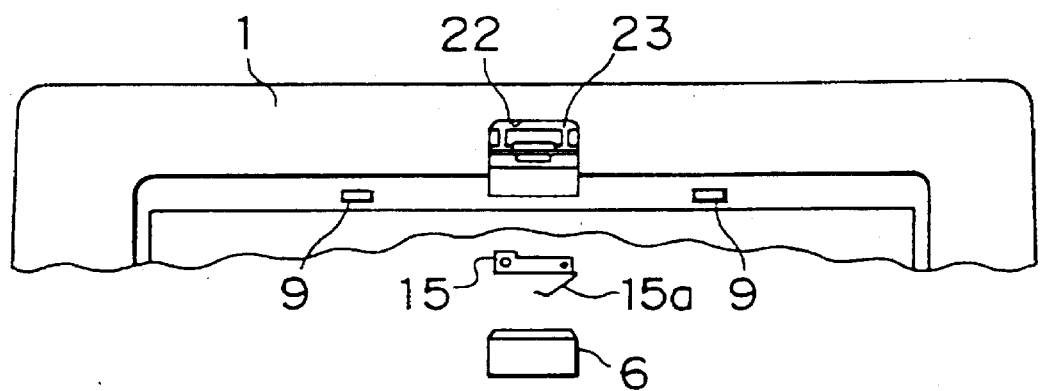
FIGS. 7A and 7B are an exploded view and a front view of a display-lid lock mechanism provided on the front face of the personal computer.
Figure 7B:
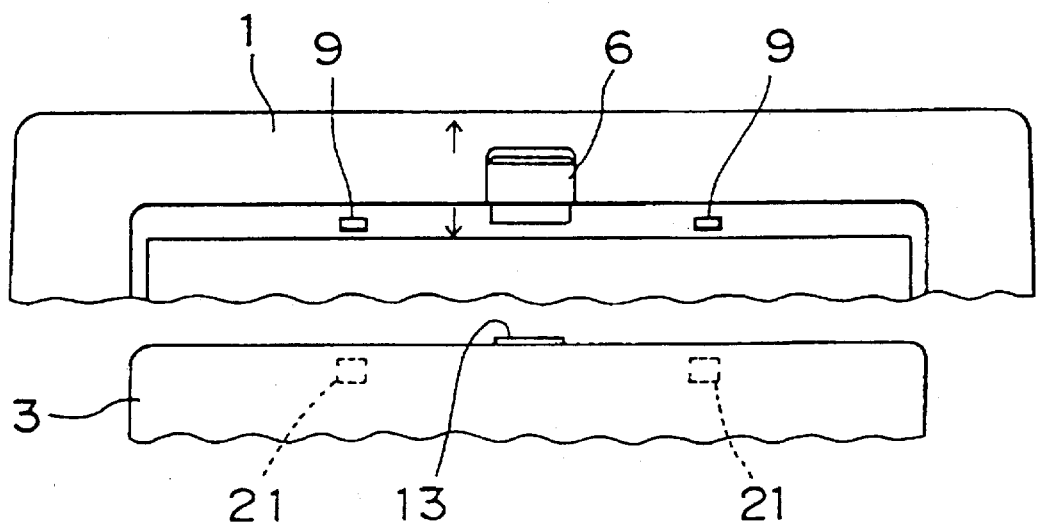

FIG. 7A shows a configuration of a display-lid lock mechanism provided on upper part of the front face of the upper cabinet 1. More specifically, a mounting hole 22 fitted with a spring member support 23 is provided on upper part of the front face of the upper cabinet 1. The spring member support 23 has a spring member 15, which has a plate spring 15a, attached thereto by a self-tapping screw 16 and the lock 6 further attached thereto, as shown in FIGS. 7C and 7E. FIGS. 7E, 7C, and 7D schematically illustrate the upper part of the front face of the upper cabinet after the above parts have been attached thereto, as it is viewed from front, side, and above, respectively. As shown in FIGS. 7E and 7C, the lock 6 is installed in the state that a rod 6a and an arm 6b are inserted into an aperture of the spring member support 23, so that the lock 6 is movable upward and downward within the aperture. When left, the lock 6 is biased downward by the plate spring 15a so as to be captively held to the lower edge of the aperture of the spring member support 23. Further, as shown in FIG. 7B, recesses 21, 21 that will fit to projections 9, 9 are provided at portions of the display lid 3 corresponding to the projections 9, 9 for anti-sliding use for the display lid 3 of the upper cabinet 1.

FIGS. 8 to 15 show the function of the lid lock mechanism. FIGS. 8 and 9 show a state of upper part of the front face of the upper cabinet 1 prior to locking (open state), and another state after locking (closed state), respectively. Also, FIG. 10 is a sectional view taken along the line X—X in FIG. 8, and FIG. 12 is a sectional view taken along the line XII—XII in FIG. 9, and FIG. 11 is a sectional view showing a transition from the open state of FIG. 10 to the closed state of FIG. 12. Meanwhile, FIG. 13 is a sectional view taken along the line XIII—XIII in FIG. 8, and FIG. 15 is a sectional view taken along the line XV—XV in FIG. 9, and FIG. 14 is a sectional view showing a transition from the open state of FIG. 13 to the closed state of FIG. 15. When the display lid 3 is locked on the front face of the upper cabinet 1, the recesses 21 on the display lid 3 side are fitted to the projections 9 of the upper cabinet 1, as shown in FIGS. 13 to 15, whereby the display lid 3 is stopped from back and forth movement. At the same time, as shown in FIGS. 10 to 12, the lock 6 is slid upward, whereby the projection 13 on the display lid 3 side is fitted to the upper cabinet 1. Subsequently, when the lock 6 is released, the lock 6 slides downward by being biased by the plate spring 15a shown in FIGS. 7A, 7C and 7E. By this movement, the projection 13 on the display lid 3 side is pressed downward by the lock 6, thereby stopped from moving upward. As a result, the display lid 3 is locked securely. The display lid 3 is unlocked by sliding the lock 6 upward and then the display lid 3 is raised up from the front face of the upper cabinet 1.

FIG. 3A illustrates the rear face of the main body 31 as it is viewed straightly in a state that the display lid 3 is opened. FIG. 3B is a sectional view taken along the line III—III of FIG. 3A. As shown in FIG. 3A, a hemispheric concave portion 11 is provided on upper part of the rear face of the main body 31 for a convenience for the operator to pull up the support plate 8 or the display lid 3 by finger. Also, projections 10, 10 for use of locking the display lid 3 are provided on left and right sides of the concave portion 11. As described below, with the display lid 3 locked to the rear face of the main body, the projections 10, 10 will fit to recesses 12, 12 on the display lid 3 side.

Figure 16A:
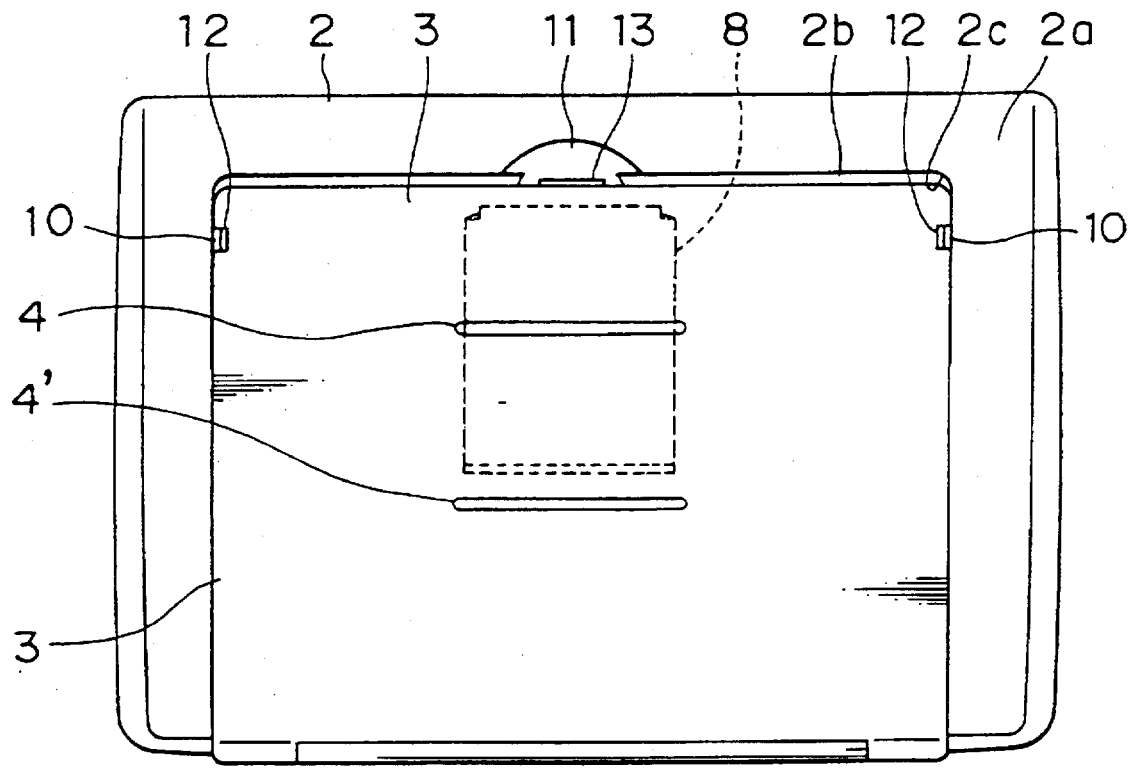
FIG. 16A is a view showing a construction of the display-lid lock mechanism provided on the rear face of the personal computer.
Figure 16B:
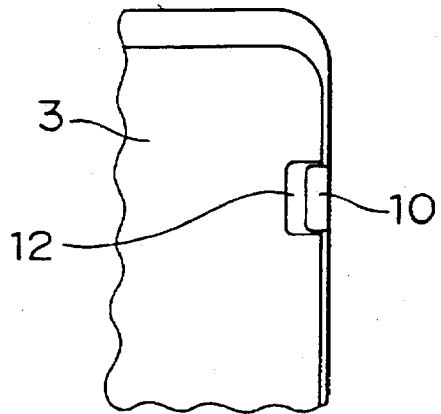
FIG. 16B is an enlarged view of the lock mechanism part of FIG. 16A.
Figure 16C:
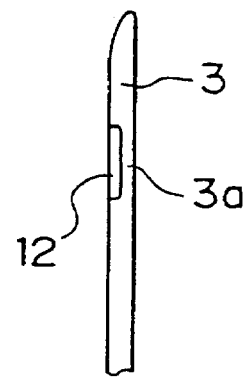
FIG. 16C is a view of a display lid of FIG. 16B viewed from side.

FIG. 16A shows a state that the display lid 3 is locked on the rear face of the lower cabinet 2, while FIG. 16B shows a lock mechanism part in enlargement. As shown in FIG. 16A, an upper peripheral portion 2a (an area of generally U-shape) on the rear face of the lower cabinet 2 is swollen with respect to an inner area 2b, where a step 2c is provided at their boundary. As shown in FIG. 16B, a thin-plate projection 10 is provided at the step 2c so as to be separated from the lower cabinet 2 surface and projected toward the inner area 2b. Meanwhile, a side recess 12 is provided at a position of the display lid 3 corresponding to the projection 10 of the lower cabinet 2. As shown in FIG. 16C, the position 3a of the display lid 3 at which the recess 12 is provided is made thinner in thickness than the rest.

When the display lid 3 is locked on the rear face of the lower cabinet 2, the display lid 3 is pressed against the rear face of the cabinet. Then, the thinner portion 3a of the display lid 3 goes beyond the projection 10 of the lower cabinet 2, so that the projection 10 of the lower cabinet 2 fits to the recess 12 of the display lid 3. As a result, the display lid 3 is captively held to the rear face of the lower cabinet 2 (locked state). To unlock the display lid 3, the operator puts the finger into the hemispheric concave portion 11 and pulls up the display lid 3 while warping it. Thus, the thinner portion 3a of the display lid 3 goes beyond the projection 10 of the lower cabinet 2, so that the display lid 3 is unlocked.

Figure 4A:
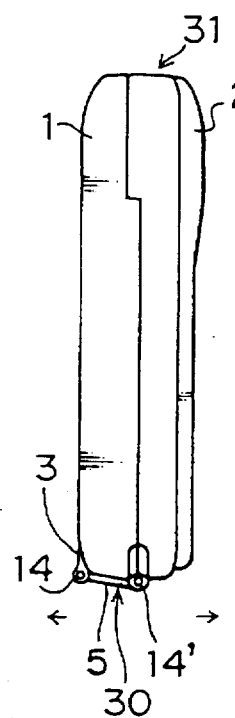
FIGS. 4A to 4G are views showing the operation of moving the display-section cover of the personal computer from the front face side to the rear face side.
Figure 4B:
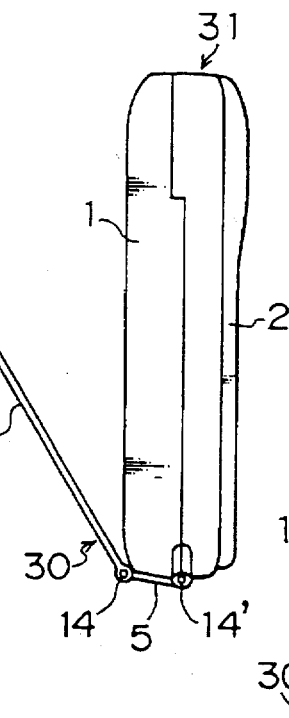
Figure 4C:
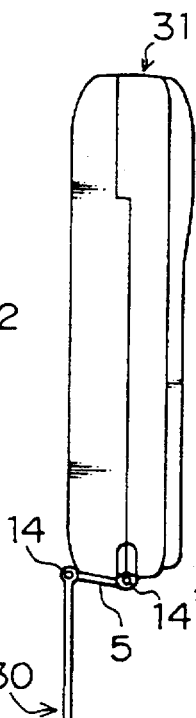
Figure 4D:
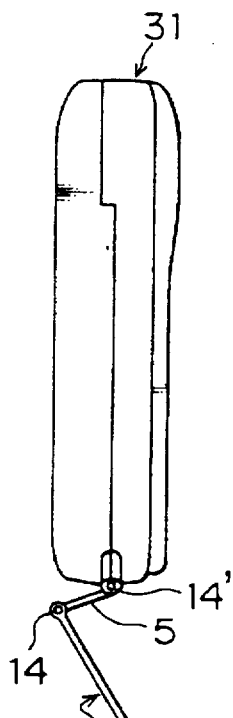
Figure 4E:
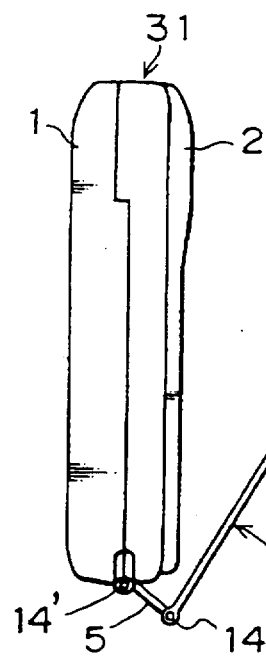
Figure 4F:
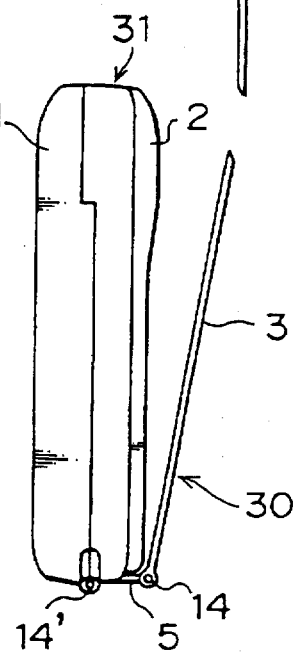
Figure 4G:
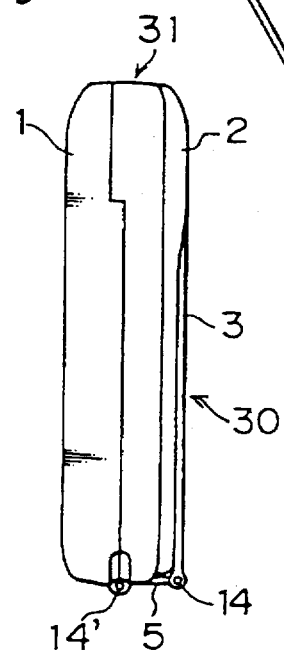

FIGS. 4A to 4G show the operation from a state that the display lid 3 is closed on the front face of the main body 31 to another state that the display lid 3 is turned to the rear side and locked to the rear face of the main body 31. As shown in FIG. 4A, it is assumed that the display lid 3 is closed on the front face of the main body 31. First, as shown in FIG. 4B, the display lid 3 is pulled up from the front face of the main body 31. In this example, the hinge plate 5 is kept at rest, and the display lid 3 will turn around the pin 14. From a time point when the display lid 3 is opened to 180° as shown in FIG. 4C, the hinge plate 5 is separated from the lower face of the upper cabinet 1 and turns around the pin 14' as shown in FIGS. 4D to 4E. Then, the hinge plate 5 is put into contact with the lower face of the lower cabinet 2 as shown in FIG. 4F, and thereafter the display lid 3 is locked to the rear face of the main body 31 as shown in FIG. 4G.

Figure 5A:
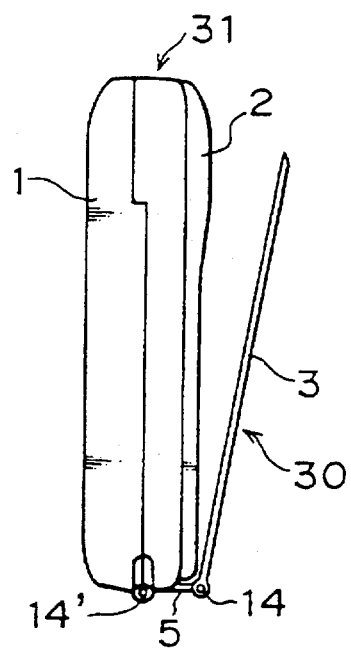
FIGS. 5A to 5E are views showing the operation of putting the personal computer into the stand mode.
Figure 5B:
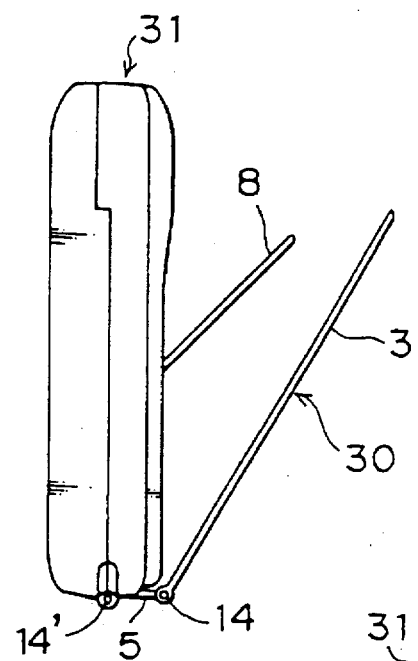
Figure 5C:
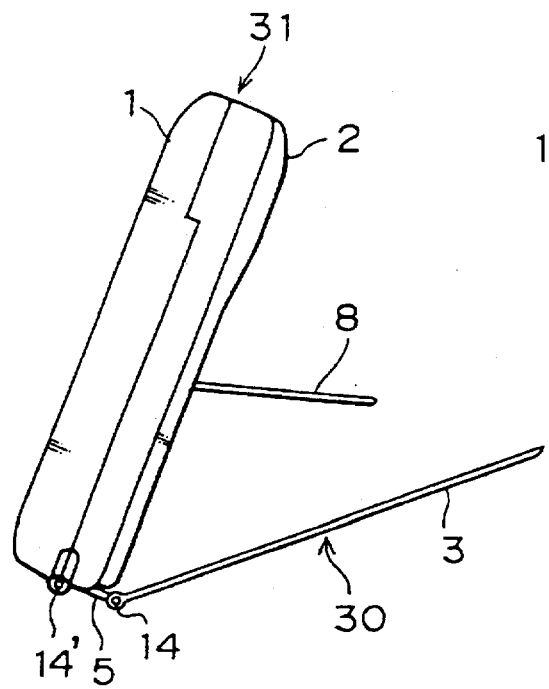
Figure 5D:
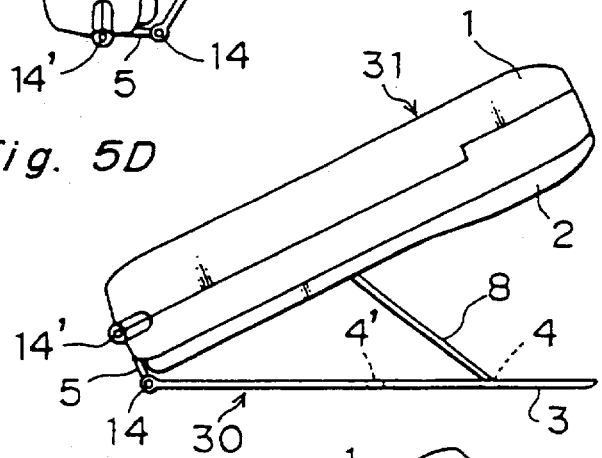
Figure 5E:
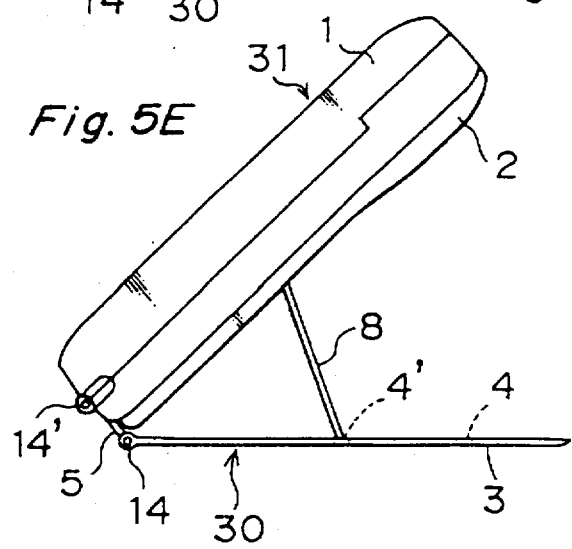

FIGS. 5A to 5E show an operation from the state that the display lid 3 is locked to the rear face of the main body 31 (FIG. 4G) to a stand mode. More specifically, first, as shown in FIG. 5A, the display lid 3 is pulled up from the rear face of the main body 31, and turned around the pin 14. While this is done, the main body 31 and the hinge plate 5 remain at rest. Next, as shown in FIG. 5B, the support plate 8 is pulled up from the rear face of the main body 31. Subsequently, as shown in FIG. 5C, the upper part of the main body 31 is tilted down backward, and the main body 31 and the hinge plate 5 are turned integrally around the pin 14. Then, as shown in FIG. 5D or 5E, the end of the support plate 8 is inserted into the slot 4 or 4', with the result of the stand mode. That is, the display-section cover 30 and the support plate 8 make up a stand. In this process, selecting either the slot 4 or 4' allows the operator to control the angle of the display surface (front face of the main body) in two steps.

As shown above, it is arranged not that a display-section cover and a stand are provided independently of each other, but that the display-section cover 30 serves as part of the stand. Accordingly, the operation before use is only one step of turning the display-section cover 30 to the rear of the main body 31 to serve as a stand. Also after use, the original state can be restored by one step. Thus, the operation for the start and end of use can be simplified, as compared with the conventional counterpart.

Also, as compared with the arrangement that the display-section cover and the stand are provided independently of each other, the number of parts involved can be reduced. Accordingly, the time required for product assembly can be reduced, the productivity can be enhanced, and yet wasteful cost can be eliminated. Further, the reduced number of parts leads to a reduced weight of the product, so that free operability inherent in the portable device can be exploited to the most.

Since the display-section cover 30 and the stand, which is made up of the display-section cover 30 and the support plate 8, are both attached integrally to the main body 31, the possibility of loss of the display-section cover or the like can be eliminated, unlike the case where the display-section cover 30 and the stand are removable type.

In the above description, there are provided the slots 4, 4' of the display lid 3 being through. However, it is required only to be able to captively hold the support plate 8, and therefore there may be provided grooves having a depth up to an intermediate point of the display lid 3. Also, the slots or grooves may be replaced with projections that serve as engaging portions.

Figure 17A:
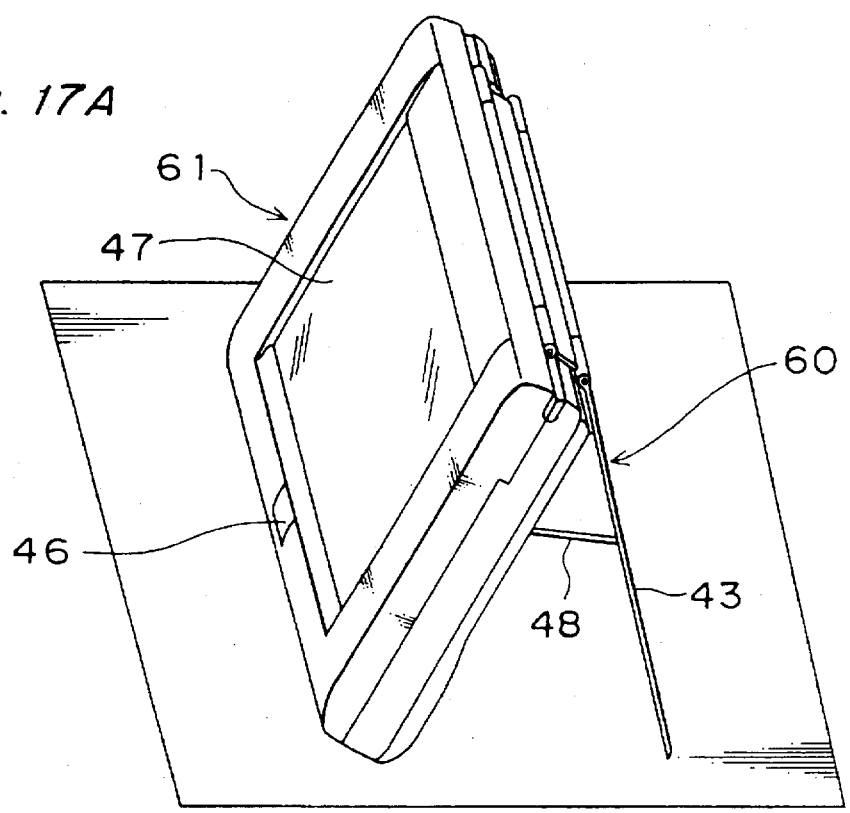
FIGS. 17A and 17B are views showing a stand mode of a portable pen-input personal computer having another exterior structure.
Figure 17B:
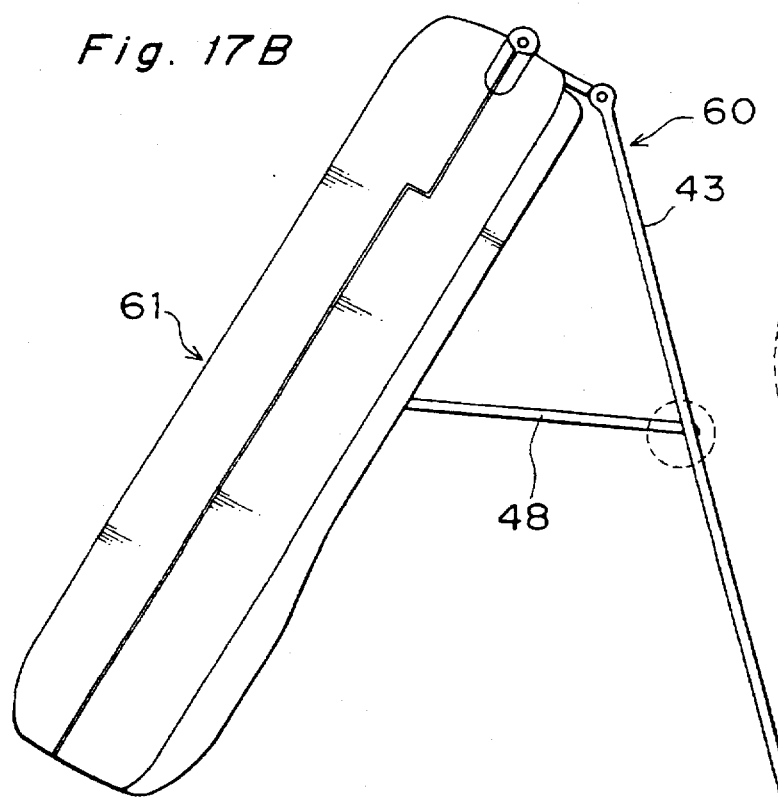

FIGS. 17A and 17B illustrate a portable pen-input personal computer having another exterior structure. FIG. 17A is a view of the personal computer in its stand mode as it is viewed overall diagonally, and FIG. 17B is a view of FIG. 17A viewed from side.

Figure 17C:
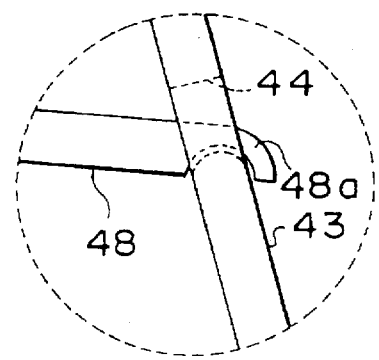
FIG. 17C is a partly enlarged view of FIG. 17B.
Figure 18A:
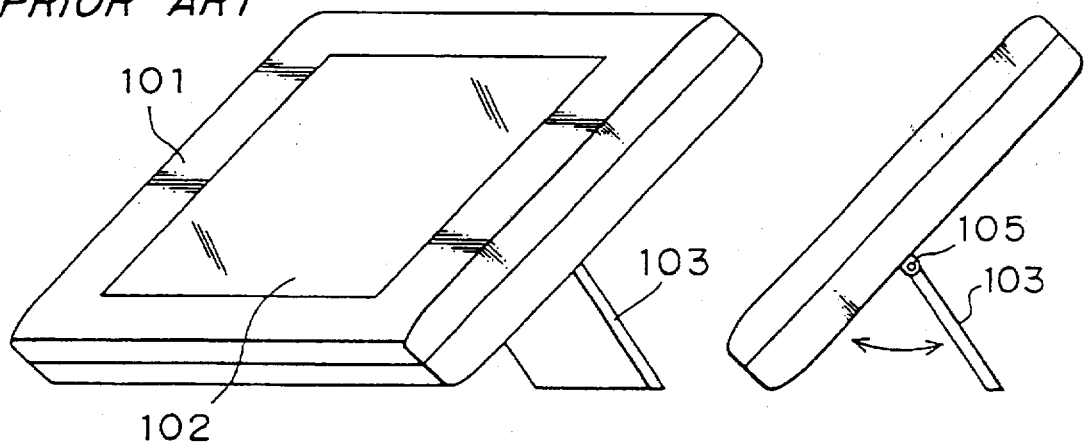
FIG. 18A is a view of a portable pen-input personal computer provided with a conventional stand, as it is viewed overall diagonally.
Figure 18B:
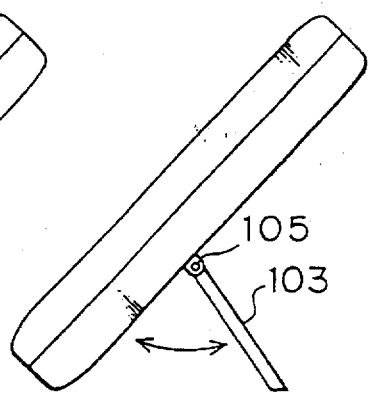
FIG. 18B is a view of the portable pen-input personal computer provided with the conventional stand, as it is viewed overall from side.
Figure 18C:
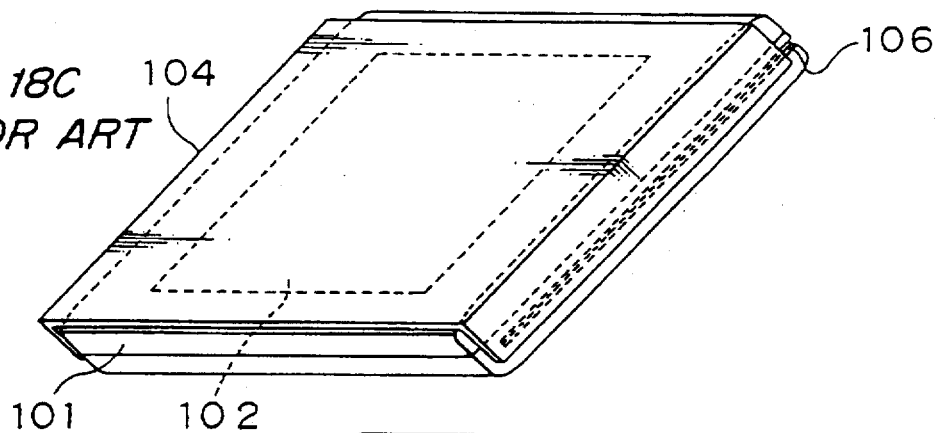
FIG. 18C is a view of a portable pen-input personal computer provided with a conventional display-section cover, as it is viewed overall diagonally.
Figure 18D:
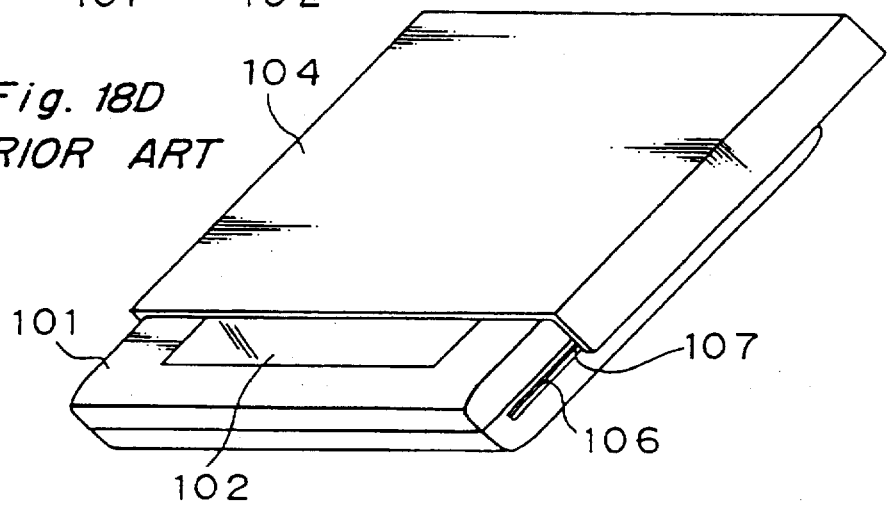
FIG. 18D is a view showing a state that the display-section cover of FIG. 18C has been slid.
Figure 18E:
FIG. 18E is a view of FIG. 18C viewed from below.

This example differs from the foregoing in that a display-section cover 60 is attached to upper part of a main body 61. In correspondence to this, a lock mechanism on the front and rear faces of the main body is arranged upside down. For example, a lock 46 is provided on the lower side of a display section 47. Also, in this example, as shown in FIG. 17C, it is arranged that an insertion slot 44 as an engaging portion for a display lid 43 is engaged with an end 48a of a support plate 48. That is, the lower edge of the insertion slot 44 running through the lid surface is formed into a convex of semicircular shape in cross section, while the end lower face of the support plate 48 is formed into a concave of semicircular shape in cross section. By this arrangement, the back and forth movement of the display lid 43 is captively stopped by the support plate 48, so that the angle between the body 61 rear face and the display lid 43 is maintained. If such a slot 44 is provided at some number of positions on the display lid 43, the angle between the body 61 rear face and the display lid 43 can be controlled in some number of steps.

With the above arrangement, as in the foregoing example, the operation for start and end of use can be simplified, as compared with the conventional counterpart. Also, the number of parts can be reduced, so that the time required for product assembly can be shortened, the productivity can be enhanced, and yet that wasteful cost can be eliminated. Further, the product can be reduced in weight, so that the free operability inherent in the portable device can be exploited to the most. Moreover, there is no possibility that the display-section cover or the like may be lost.

As apparent from the above description, according to an exterior structure for a display device of the present invention, when the display device is stored or carried, the hinge plate of the display-section cover is tilted down to a first surface side of the main body, and the display lid is put into contact with the first surface. Therefore, the display section is covered with the display-section cover, whereby the display section is protected from flaws, dusts, heat, and the like. When the device is used, the hinge plate of the display-section cover is tilted down to a third surface side, so that the display lid is put into contact with the third surface. Or, the display-section cover is used as part of the stand.

According to an exterior structure for a display device in an embodiment, one edge of the hinge plate is attached substantially within the second surface of the main body generally in a center with respect to a direction vertical to the first surface. The size between the one edge and the other edge of the hinge plate is set to approximately half the size of the second surface in the vertical direction. Therefore, when the display device is stored or carried, and when it is used, the display-section cover can be prevented from making an obstacle.

According to an exterior structure for a display device in an embodiment, when the display device is used, upper part of the main body is tilted down diagonally to the third surface side, the other edge of the support plate is engaged with the engaging portion of the display lid. By this arrangement, the display-section cover and the support plate make up a stand, whereby the main body is supported diagonally to the desk or the like (stand mode). In this way, it is arranged not that the display-section cover and the stand are provided independently of each other, but that the display-section cover forms part of the stand. Therefore, the operation required before use is only one step of turning the display-section cover to the rear of the main body so that the display-section cover serves as the stand, and also only one step will be required for restoration of the original state after use. Accordingly, the operation for start and end of use of the display device can be simplified as compared with the conventional counterpart, so that the operability can be enhanced. Also, the number of parts involved can be reduced as compared with the case where the display-section cover and the stand are provided independently of each other. As a result, the time required for product assembly can be shortened, productivity can be improved, and yet wasteful cost can be eliminated. Further, the reduced number of parts involved allows the product weight to be reduced, so that the free operability inherent in the portable device can be exploited to the most. Furthermore, since the display-section cover and the support plate are attached integrally to the main body, there is no possibility that the display-section cover or the like may be lost.

According to an exterior structure for a display device in an embodiment, the engaging portion of the display lid is a slot formed in parallel to the other edge of the hinge plate. Accordingly, when the stand mode is taken at the time of start of use, the display lid can be easily captively held only by inserting the other edge of the support plate into the slot of the display lid. Also after use, the display lid can be restored to the original state only by pulling off the other edge of the support plate from the slot of the display lid. Thus, the operation for start and end of use of the display device can be further simplified, so that the operability can be enhanced.

According to an exterior structure for a display device in an embodiment, the second surface of the main body is a surface on the lower or upper side of the first surface. When the second surface is a surface on the lower side of the first surface, the hinge plate is tilted down to the third surface side of the main body, and the display lid is positioned on the desk in parallel. Then, the upper part of the main body is tilted down to the third surface side, and the other edge of the support plate is inserted into the slot of the display lid and held as such. As a result, the display-section cover and the support plate make up a stand, so that the main body can be supported diagonally to the desk (stand mode). Meanwhile, when the second surface is a surface on the upper side of the first surface, the hinge plate is tilted down to the third surface side of the main body, and the end of the display lid is put into diagonal contact with the desk. Then, the upper part of the main body is tilted down to the third surface side, so that the other edge of the support plate is inserted into the slot of the display lid and held as such. As a result, the main body can be supported by the lower end corner of the third surface and the end of the display lid (stand mode).

According to an exterior structure for a display device in an embodiment, a plurality of slots of the display lid are provided with a spacing to one another. Accordingly, the angle formed by the third surface of the main body and the display lid can be varied stepwise by selecting a slot into which the support plate is inserted, whereby the angle of the first surface of the main body can be controlled. As a result, the operator is allowed to view the display section at an optimum angle, which leads to further improved operability.

According to an exterior structure for a display device in an embodiment, the slot of the display lid is running through the display lid. Besides, an inner surface of the slot farther than the hinge plate is curved inward of the slot in a convex shape in cross section, and the end of the other edge side of the support plate is curved in a concave shape in cross section so as to fit to the inner surface of the slot. Therefore, even if the second surface is on the upper side of the first surface, the display lid can be captively held by the support plate with stability.

According to an exterior structure for a display device in an embodiment, the lock mechanism for captively holding the display lid is provided on the first or third surface or both the first and third surfaces of the main body. When the lock mechanism is provided on the first surface, the display lid is captively held to the first surface for storage or carrying, whereby the display lid can be prevented from being opened when dropped and subjected to shocks. Accordingly, the display section can be protected securely. Also, when the lock mechanism is provided on the third surface, the display lid is captively held by the third surface with the hinge plate tilted down to the third surface side and with the display lid in contact with the third surface during use of the device, whereby particularly the display lid can be prevented from swinging and making an obstacle when the main body is lifted.

According to an exterior structure for a display device in an embodiment, the lock mechanism of the first surface of the main body is provided at a position on one side of the first surface opposite to the second surface side with respect to the display section. Further, the lock mechanism comprises a lock slidable toward the display section along the first surface, and an elastic member for biasing the lock toward the display section. Therefore, the display lid can be locked to and unlocked from the first surface securely by simple operation.

According to an exterior structure for a display device in an embodiment, the lock mechanism on the third surface of the main body is provided on the peripheral portion of the inner area of the third surface with which the display lid will make contact. The lock mechanism comprises a plate-shaped projection separated from the surface of the inner area and projecting into the inner area by a specified extent. Therefore, the display lid can be locked to and unlocked from the third surface securely with simple operation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An exterior structure for a display device having a display section for displaying an image on a first surface of a main body of a generally box shape, comprising:
    a display-section cover which comprises a generally rectangular hinge plate that includes a first tubular portion located at an edge surface, said rectangular hinge plate attached in a first hinge fashion to a second surface of the main body adjacent to the first surface, with one edge of the hinge plate parallel to the first surface, and a display lid attached in a second hinge fashion to the other edge of the hinge plate opposite to the one edge of the hinge plate; and
    a support plate having a generally rectangular shape and being attached in hinge fashion to a third surface opposite to the first surface of the main body with one edge of the support plate parallel to the second surface;
    wherein the display lid comprises an engaging portion capable of captively holding the outer edge of the support plate opposite to the one edge.

2. The exterior structure for a display device as claimed in claim 1, wherein
    the one edge of the hinge plate is attached substantially within the second surface of the main body at a generally center portion with respect to a direction vertical to the first surface, and
    a dimension between the one edge and the other edge of the hinge plate is set to substantially half a dimension of the second surface of the main body in the direction vertical to the first surface of the main body.

3. The exterior structure for a display device as claimed in claim 1, wherein
    the engaging portion of the display lid is at least a slot formed in parallel to the other edge of the hinge plate.

4. The exterior structure for a display device as claimed in claim 3, wherein
    the slot of the display lid is provided in a plural number with a spacing from one another.

5. The exterior structure for a display device as claimed in claim 3, wherein
    the slot of the display lid is penetrating through the display lid and an inner surface of the slot farther from the hinge plate is curved in a convex shape in cross section inward of the slot; and
    an end of the other edge side of the support plate is curved in a concave shape in cross section so as to fit the inner surface of the slot.

6. The exterior structure for a display device as claimed in claim 1, wherein
    a lock mechanism for captively holding the display lid is provided on the first surface or a third surface of the main body opposite to the first surface or both the first and third surfaces of the main body.

7. The exterior structure for a display device as claimed in claim 6, wherein
    the lock mechanism is provided on the first surface of the main body and is provided at a position on one side of the first surface opposite to the second surface side with respect to the display section, the lock mechanism comprising a lock slidable toward the display section along the first surface and an elastic member for biasing the lock toward the display section.

8. The exterior structure for a display device as claimed in claim 6, wherein
    the lock mechanism is provided on the third surface of the main body and is provided on a peripheral portion of an inner area of the third surface, with which the display lid will be brought into contact, the lock mechanism including a plate-shaped projection being separated from the surface of the inner area and projecting into the inner area by a specified extent.

9. The exterior structure for a display device as claimed in claim 1, including a second tubular portion located at an edge surface of the hinge plate opposite said first tubular portion.

10. The exterior structure for a display device as claimed in claim 9, wherein pins extend into said first tubular portion at opposite ends thereof.

11. The exterior structure for a display device as claimed in claim 10, wherein pins extend into said second tubular portion at opposite ends thereof.

12. The exterior structure for a display device as claimed in claim 1, wherein the lid includes two spaced-apart pin holders located at a lower edge of the lid.

13. The exterior structure of a display device as claimed in claim 1, wherein the main body includes two spaced-apart pin holders.

* * * * *